June 29, 1948.  G. A. LYON  2,444,054
WHEEL HUB CAP
Filed Feb. 4, 1946
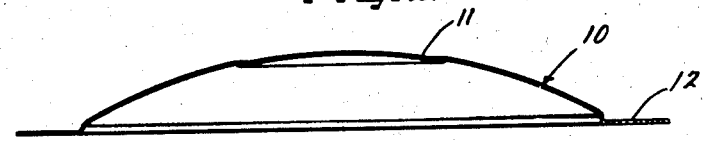
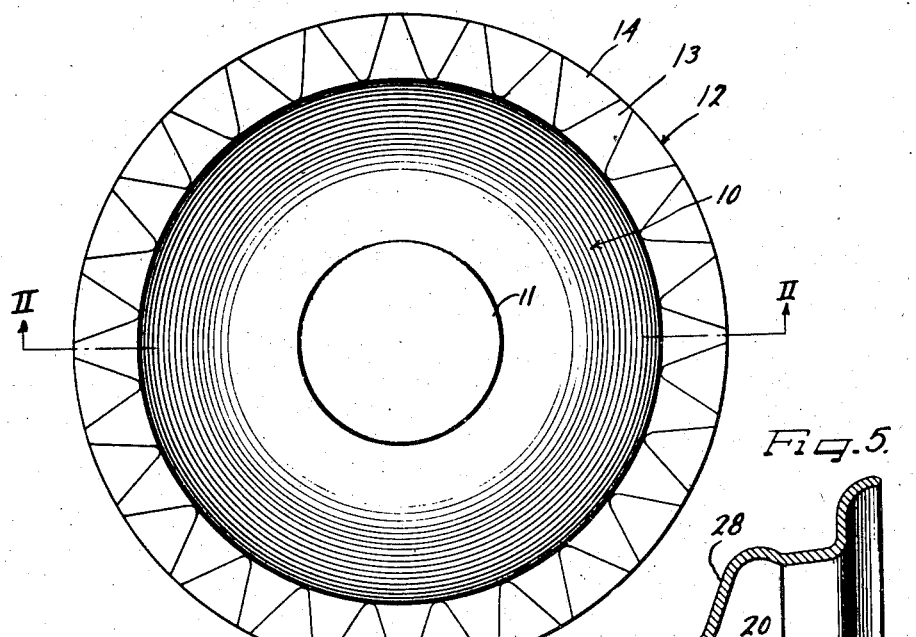
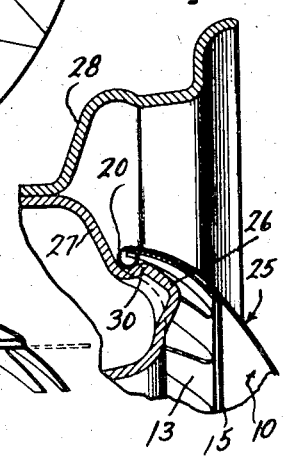
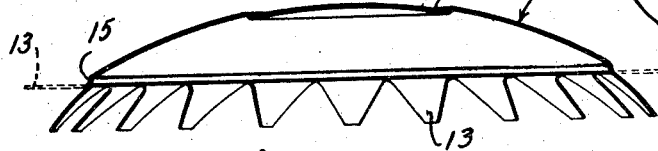
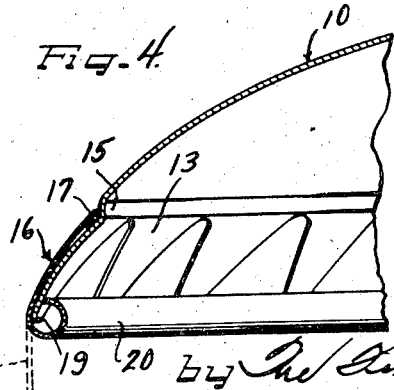
Inventor
GEORGE ALBERT LYON Patented June 29, 1948

2,444,054

UNITED STATES PATENT OFFICE 2,444,054

WHEEL HUBCAP

George Albert Lyon, Allenhurst, N. J.

Application February 4, 1946, Serial No. 645,356

4 Claims. (Cl. 301—108)

This invention relates to wheel covers, and more particularly to a hub cap for an automobile wheel.

An object of this invention is to provide a wheel cover or an automobile hub cap which can be more economically manufactured on a large production basis.

Another object of this invention is to provide a wheel cover or a hub cap which can be made of thinner metal and still have the requisite rigid and resilient characteristics at the areas desired in the use of a cap.

Yet another object of this invention is to provide a wheel hub cap having a resilient edge which includes a band serving to both rigidify and ornament the cap.

In accordance with the general features of this invention there is provided an automobile wheel cover or hub cap comprising a crowned stamping having a serpentine-like marginal portion enveloped by a rigidifying band interlocked therewith and formed into a rolled edge at the extremity of the serpentine margin adapted to yield in the application and removal of the cap to and from a wheel.

Another feature of the invention relates to the serpentine margin of the main body of the cap providing fingers which afford a resilient support for the band, having a turned edge which is to engage bumps or the like on a wheel.

Other objects and features of this invention will more fully appear from the following detailed description taken in connection with the accompanying drawings which illustrate a single embodiment thereof, and in which Figure 1 is a plan view of a crowned stamping from which the main body of my novel hub cap is made;

Figure 2 is a cross-sectional view taken on the line II—II of Figure 1 looking in the direction indicated by the arrows;

Figure 3 is a cross-sectional view similar to Figure 2 showing the serpentine margin of the cap bent downwardly to form fingers on the cap the dotted line showing the position of the marginal portion prior to the bending operation;

Figure 4 is an enlarged fragmentary cross-sectional view of a portion of the finished cap showing how a band with a beaded edge is interlocked with the resilient fingers at the outer margin of the crowned cap, the dotted line showing the position of the margin of the band prior to it being bent into the beaded edge; and Figure 5 is a fragmentary cross-sectional view through a wheel showing my novel hub cap applied to the bumps thereof.

As shown on the drawings:

The reference character 10 designates generally a dished or crowned stamping which may be made of any suitable thin sheet metal, such as steel sheet. The central portion of this dished stamping 10 may be indented at 11 so as to accommodate an emblem or the like (not shown). The indentation 11 serves to rigidify the outermost central portion of the dished stamping 10. The margin of the stamping 10 is turned outwardly into an annular flange 12. This flange is adapted to be subjected to a press operation so as to form it into a serpentine-like margin thereby providing spaced resilient fingers 13.

In Figure 1 I have shown the fingers 13 cut in the margin, but I have not shown the surplus metal removed therefrom, whereas in Figure 3 I have shown the fingers 13 without the intermediate cut-out portions.

In practice, the stamping 10 may be first made in a suitable press with the outer margin 12 in a solid condition. Thereafter in a subsequent press operation the spaced portions 14 can be stamped from the margin 12, which, upon being stripped from the margin, leave the fingers 13.

In the next operation the fingers 13 are bent from a horizontal plane to an angular position, as shown in Figure 3, wherein they are slightly offset from the main body of the stamping thus providing an annular shoulder 15.

I then dispose over the fingers 13 an annular lustrous band 16, which has a turned edge 17 adapted to abut the shoulder 15, as shown in Figure 4. The other edge portion 18, as shown by dotted lines in Figure 4, is adapted to be thereafter turned or rolled into a hollow beaded edge 20 into which the extremities 19 of the fingers project. Thus the band 16 is locked to the stamping 10 between the shoulder 15 and the extremities 19 of the fingers 13. This band is preferably made of resilient sheet metal, such as stainless steel which lends itself to a high lustrous finish.

Now by reason of the fact that the beaded edge 20 is supported by the fingers 13, the edge can yield in the use of a cap with reference to the main stamping. In other words, the fingers 13 constitute a resilient support for the beaded edge 20. In this manner I am enabled to make a cheaper cap since it is not necessary to make the entire stamping 10 of the more expensive resilient sheet steel, such as stainless steel. Any good quality of steel sheet may be used for the stamping 10.

This hub cap of my invention, as designated generally by the reference character 25 in Figure 5, is adapted to be snapped over, in the usual way, spaced bumps or protuberances 26 formed on the body part 27 of a conventional automobile wheel which body part carries a drop center tire rim 28.

The bumps 26 are circumferentially spaced about the central portion of the body part 27 and each includes an inclined shoulder 30 over which the beaded edge 20 of the hub cap 25 is adapted to be cammed. Any suitable number of bumps or protuberances 26 may be employed, such, for example, as three to five.

It will be appreciated that in applying the hub cap 25, it is first aligned with the center of the wheel and then pressure is exerted against the crowned portion of the cap so as to cam the beaded edge 20 over the high points of the bumps 26. In this operation, the edge 20 springs outwardly and then snaps inwardly against the reentrant shoulder 30 thus retaining the cap on the wheel. The diameter of the circle in which the reentrant shoulder 30 of the bumps 26 is disposed is such that the edge 20 does not completely spring back to its normal position and hence is in tension engagement with the bumps.

In the removal of the cap, the edge of any suitable pry-off tool, such as a screw driver, may be inserted under the edge 20 for the purpose of forcibly prying the cap free of the bumps 26.

It will also be appreciated that the more rigid material of stamping 10, comprising the hub cap 25, as well as its configurations, will resist any tendency to indent the same. A hub cap of this construction can be very economically manufactured on a large production basis for use in the production line of an autotombile manufacturer.

I claim as my invention:

1. As an article of manufacture a wheel hub cap comprising a circular crowned portion terminating in inclined spaced fingers and an annular band mounted over said fingers and having a turned edge interlocked with the extremities of the fingers so as to be resiliently supported thereby for yieldable engagement with a wheel part.

2. As an article of manufacture a wheel hub cap comprising a circular crowned portion terminating in inclined spaced fingers and an annular band mounted over said fingers and having a turned edge interlocked with the extremities of the fingers so as to be resiliently supported thereby for yieldable engagement with a wheel part, the junction of said fingers with said portion comprising an annular shoulder against which an edge portion of said band is seated and retained.

3. In a cover structure for a wheel including tire rim and body parts, one of which is provided with spaced protuberance means, a circular hub cap comprising a crowned portion terminating in spaced resilient fingers and an annular band disposed over said fingers and having a turned edge interlocked with the extremities thereof and of such diameter as to have a tensioned retaining engagement with said protuberance means, said fingers providing a yieldable backing for the band of the hub cap.

4. In a cover structure for a wheel including tire rim and body parts, one of which is provided with spaced protuberance means, a circular hub cap comprising a crowned portion terminating in spaced resilient fingers and an annular band disposed over said fingers and having a turned edge interlocked with the extremities thereof and of such diameter as to have a tensioned retaining engagement with said protuberance means said fingers providing a yieldable backing for the band of the hub cap, the junction of said crowned portion with said band being indented to form an annular shoulder against which the other edge of said band is tightly seated and retained.

GEORGE ALBERT LYON.

REFERENCES CITED

The following references are of record in the file of this patent:

UNITED STATES PATENTS

| Number | Name | Date |
| --- | --- | --- |
| 1,320,551 | Holley | Nov. 4, 1919 |
| 1,835,601 | Joyce | Dec. 8, 1931 |
| 1,965,529 | Lyon | July 3, 1934 |